United States Patent [19]

Kittrell et al.

[11] Patent Number: 5,340,918
[45] Date of Patent: Aug. 23, 1994

[54] PROCESS FOR THE STABILIZATION OF COPOLYMERS OF MALEIC ANHYDRIDE AND ALKYL VINYL ETHERS

[75] Inventors: James R. Kittrell; Charles W. Quinlan, both of Amherst, Mass.

[73] Assignee: KSE Inc., Sunderland, Mass.

[21] Appl. No.: 121,245

[22] Filed: Sep. 14, 1993

Related U.S. Application Data

[63] Continuation of Ser. No. 902,015, Jun. 23, 1992, abandoned.

[51] Int. Cl.$^5$ ................................................ C08F 6/28
[52] U.S. Cl. ................................... 528/483; 526/272
[58] Field of Search ......................... 528/483; 526/272

[56] References Cited

FOREIGN PATENT DOCUMENTS 258416  7/1988  Fed. Rep. of Germany .
18144   5/1971  Japan .

*Primary Examiner*—Joseph L. Schofer
*Assistant Examiner*—Tom Weber
*Attorney, Agent, or Firm*—Bachman & LaPointe

[57] ABSTRACT

A copolymer of maleic anhydride and an alkyl vinyl ether is stabilized by contacting same with a non-reactive substantially moisture free gas at a temperature of from about 30°–100° C. for from about 0.5–24 hours. The copolymer is preferably prepared by reacting together maleic anhydride and an alkyl vinyl ether in the presence of a free radical initiator.

20 Claims, No Drawings

PROCESS FOR THE STABILIZATION OF COPOLYMERS OF MALEIC ANHYDRIDE AND ALKYL VINYL ETHERS

This is a continuation of co-pending application Ser. No. 07/902,015 filed on Jun. 23, 1992, now abandoned.

BACKGROUND OF THE INVENTION

It is highly desirable to produce copolymer of maleic anhydride and alkyl vinyl ethers which have a stable specific viscosity and which are not accompanied by the presence of potentially harmful solvents.

Copolymers of maleic anhydride and alkyl vinyl ether have a variety of important commercial uses, in the medical, cosmetic, pharmaceutical, food and other industries. One important property of the copolymer for these applications is its molecular weight, as commonly measured by its specific viscosity of a 1% (wt./vol.) solution in methyl ethyl ketone at 25° C. For example, U.S. Pat. No. 3,003,988, teaches that a useful denture stabilizing composition is obtained from such copolymers having a specific viscosity exceeding 1.2, and observed good results with copolymers exhibiting a specific viscosity between 2.5 and 3.5. In many processing methods in converting the copolymer to useful consumer products, the copolymer can be exposed to temperatures of 25° C. to 90° C. for several hours during processing, for example, to manufacture the referenced denture stabilizing composition. The copolymer must maintain the desired specific viscosity during these operations at elevated temperatures. For many of the applications noted above, the benzene content of the copolymer is also an important property.

Production of interpolymers of methyl vinyl ether and maleic anhydride are generally conducted by dissolving the reactants, along with a free radical initiator, in a material which is a solvent for the reaction mix, which has no undesirable reactions with any component of the reaction mix, and which does not interfere with the free radical polymerization reaction which builds molecular weight. In addition, the material chosen as a solvent for the reaction mix is preferably a nonsolvent for the polymer product formed. The polymer thus becomes a slurry of finely divided particles as formed during the reaction, and can be separated easily from the solvent.

Maleic anhydride-alkyl vinyl ether copolymers have historically been produced in an aromatic solvent, such as benzene, as disclosed in U.S. Pat. Nos. 2,782,182 and 3,532,771. Product produced in a benzene solvent is inherently of stable shelf life in terms of viscosity, and exhibits no viscosity degradation when exposed to temperatures of 30° to 90° C. Unfortunately, benzene is a known carcinogen, and the residual benzene content of copolymer produced by this method limits the use of the copolymer in many products. However, it is very difficult to identify alternative solvents for the polymerization reaction which do not interfere with the chain growth mechanism of the polymerization reaction, and thus which are suitable for producing the desired high molecular weight copolymer product. Other solvents which are known to one skilled in the art include toluene, methylene chloride, and acetone.

U.S. Pat. No. 4,948,848 discloses a process for copolymerization of maleic anhydride and alkyl vinyl ether in acetone or ethyl acetate solvents. This procedure still produces a product containing extraneous solvents, and further requires a long time period for continuous feed of maleic anhydride dissolved in the solvent. Furthermore, to maintain the reaction product in a pumpable form, toluene was added. Toluene is commonly contaminated with small amounts of benzene. This patent also discloses the use of maleic anhydride dissolved only in methyl vinyl ether as a reactor feed, but observes that this produces undesirable results. Among other disadvantages, this patent observes that the viscosity of the copolymers cannot be controlled effectively.

U.S. Pat. No. 5,047,490 discloses a method for copolymerizing maleic anhydride and alkyl vinyl ether in an excess of the alkyl vinyl ether and without use of an extraneous solvent. However, although this reference can produce a copolymer of high molecular weight, the reference does not address the problem of long-term storage stability or degradation of product viscosity at slightly elevated temperatures of 30° C. to 90° C.

U.S. Pat. No. 4,370,454, discloses the use of a powder bed reactor to produce a copolymer of maleic anhydride and alkyl vinyl ether and/or an alkene. These copolymers are used for crust inhibition, dispersions, and the like, and generally are not of a controlled molecular weight, and many different low molecular weights are often suitable. When high molecular weights are desired, they teach the use of cross-linking agents. They do not recognize the importance of viscosity stabilization, and provide no teaching as to methods to accomplish this. It is desirable to provide a means of control of molecular weight to provide the capability to achieve high molecular weight copolymer without undesirable cross-linking agents and to provide a means of stabilizing the copolymer without the addition of foreign substances. The '454 reference does not recognize the need to accomplish these objectives, and do not teach one skilled in the art methods to accomplish these features.

A method has been disclosed in British Patent 906,230 for producing a stabilized vinyl alkyl ether-maleic anhydride interpolymer. This patent discloses that the interpolymer undergoes substantial and serious decomposition which is manifested by a decrease in viscosity over time, particularly after processing of the interpolymer at elevated temperatures. An object of that reference is to provide interpolymer compositions which are stable against degradation and/or decomposition, accomplished by the addition of free radical inhibiting compounds, such as phenols and aromatic nitro compounds. For many applications, this approach is unacceptable, due to the deleterious impact of adding these undesirable compounds to copolymers to be used in health and food applications, for example.

SUMMARY OF THE INVENTION

Accordingly, it is a principal object of the present invention to provide a method for stabilizing copolymers of maleic anhydride and alkyl vinyl ethers which is effective and convenient to employ.

It is a further object of the present invention to provide a method as aforesaid which provides a means of controlling molecular weight, provides the capability achieving a high molecular weight copolymer without undesirable cross-linking agents and which provides a means of stabilizing the copolymer without the addition of foreign substances.

It is a still further objective of the present invention to provide a method as aforesaid which provides a copolymer having a predetermined specific viscosity range which does not degrade upon storage or upon exposure to elevated temperatures.

It is a further object of the present invention to provide a method as aforesaid which enables the preparation of the copolymer in the absence of extraneous solvent and the stabilization of the resultant copolymer.

Further objects and advantages of the present invention will appear hereinbelow.

In accordance with the present invention, the foregoing objects and advantages are readily obtained.

The present invention is a process for the preparation of copolymers of maleic anhydride and alkyl vinyl ethers having a stable specific viscosity, which comprises: providing a copolymer of maleic anhydride and an alkyl vinyl ether, wherein the alkyl group contains from 1 to 5 carbon atoms; and contacting said copolymer with a flowing stream of non-reactive substantially moisture free gas at a temperature of from about 30°–100° C. for from about 0.5–24 hours at sub-critical pressure, thereby stabilizing the specific viscosity of the copolymer.

The copolymer is preferably prepared by reacting together maleic anhydride and an alkyl vinyl ether in the presence of a free radical initiator. Although the process of the present invention effectively stabilizes said copolymer prepared with a solvent if such stabilization is desirable, it is preferred to react the maleic anhydride and ether in the absence of an organic solvent in a stoichiometric excess of ether, with the molar ratio of ether to maleic anhydride being between about 1.05:1 to 25:1.

Further features and advantages of the present invention will appear hereinbelow.

DETAILED DESCRIPTION

The process of the present invention provides a copolymer with a specific viscosity which does not degrade upon storage. As indicated hereinabove, in accordance with the preferred embodiment of the present invention, the copolymer is prepared by reacting together maleic anhydride and an alkyl vinyl ether in the absence of an organic solvent in a stoichiometric excess of ether and the present invention will be discussed specifically in connection with this preferred embodiment. However, it should be understood that the present invention is not limited to this preferred embodiment and includes within its scope a process for preparing a copolymer of maleic anhydride and an alkyl vinyl ether with a stable specific viscosity by contacting said copolymer with a non-reactive substantially moisture free gas at a temperature of from about 30°–100° C. for about 0.5–24 hours, as disclosed herein.

In the preferred embodiment, the process of the invention charges maleic anhydride, alkyl vinyl ether, and a free radical initiator to a reactor, without the introduction of other organic solvents to the reactor. After dissolution of the maleic anhydride and the initiator in a stoichiometric excess of alkyl vinyl ether, the temperature is increased to initiate polymerization, thereby forming a suspension of copolymer in the alkyl vinyl ether. Upon completion of the reaction, the excess alkyl vinyl ether is removed, preferably completing the removal cycle by heating under vacuum while agitating the dried copolymer. The recovered dried copolymer is then treated in a second stage, preferably a separate vessel, with a substantially moisture-free gas in order to stabilize the viscosity of the copolymer at the predetermined viscosity range. The copolymer obtained therefrom is a fine, white powder having a specific viscosity in the range of about 0.1 to 5.5, preferably from about 1.5 to 4.5, and still more preferably 2.5 to 4.0, which viscosity does not degrade with time.

The foregoing process does not require the use of any contaminating solvent, using the excess alkyl vinyl ether as the reaction solvent, and produces a product with a long shelf life. The alkyl group of the alkyl vinyl ether can have from one to five carbon atoms, and preferably is a methyl group. The ratio of alkyl vinyl ether to maleic anhydride is between about 1.05:1 and 25:1 on a mole ratio, preferably 2:1 to 10:1, and still more preferably from 5:1 to 9:1. The free radical initiator can be peroxy esters, diacyl peroxides, dialkyl peroxides, hydroperoxy esters, azo nitrile, and the like. The initiator is present in an amount from about 0.001% to 5.0% by weight on maleic anhydride, and preferably 0.1% to 2% by weight. The polymerization is conducted at a temperature of about 30° C. to 90° C., and preferably 40° C. to 70° C., and is conveniently conducted at the pressure of the reactants. After completion of the reaction, excess alkyl vinyl ether is removed, for example by evaporation. The stabilization of the copolymer is conducted by contacting the copolymer, preferably in a separate vessel, with a substantially moisture-free gas at a temperature of about 30° C. to about 100° C., preferably 40° C. to 85° C., using a non-reactive substantially moisture-free gas which is preferably nitrogen or dry air, although others can readily be used as carbon dioxide or inert gases, for a duration of about 0.5 hour to about 24 hours, preferably 2 hours to 10 hours. Without this stabilization step, copolymer produced from a reaction mixture devoid of additional solvents, other than excess alkyl vinyl ether, does not exhibit the desired viscosity shelf life under ambient conditions or sufficient viscosity stability at elevated temperatures of use. By non-reactive gas is meant a gas which does not react with the copolymer or materials present in the reaction mix.

It has thus been found that the copolymer of alkyl vinyl ether and maleic anhydride when produced in a benzene or a toluene solvent is stable. The viscosity of the product as produced fresh from the reactor is unchanged after months of storage at ambient conditions or after exposure to elevated temperatures. However, as indicated hereinabove, these solvents are clearly disadvantageous.

However, the copolymer of alkyl vinyl ether and maleic anhydride, when produced from an excess of alkyl vinyl ether with no extraneous solvent, exhibits an unstable viscosity. A copolymer product which has been formed in a reactor and dried extensively under vacuum can exhibit a viscosity of 4.2, for example. The product will continue to exhibit a similar viscosity for a few days of storage in a sealed container, but the viscosity will then decline gradually over several months to a viscosity of 1.5 or below. Further, another sample of the reactor product can be placed in a sealed container in a 60° C. oven for several hours. Even though the product had just been exposed to a 60° C. drying step, upon further oven exposure at 60° C., the viscosity of the product drops rapidly with time, reaching 1.5 or below in only 12 hours. Further drying of the fresh reactor product does not improve this instability in viscosity, including variations of time, temperature or depth of vacuum. Similar observations of this behavior of the subject copolymer are disclosed in British Patent 906,230 referred to above.

These unstable characteristics of copolymer which is produced from the polymerization of maleic anhydride and alkyl vinyl ether in a solvent consisting of excess alkyl vinyl ether without extraneous solvents has been known since the 1962 disclosure of British Patent 906,230. Heretofore, no procedure has been identified by those skilled in the art to provide a stable copolymer without the addition of other undesirable impurities such as free radical inhibiting compounds.

Surprisingly, in accordance with the present invention, it has been found that treating the copolymer product with a flowing stream of dry gas will provide a stable copolymer. For example, a copolymer which has been treated by a flowing stream of nitrogen for 8 hours at 80° C. results in a copolymer product of a specific viscosity of 3.5. This copolymer specific viscosity remains at 3.5 after at least three months of storage or after being placed in an oven in either sealed or unsealed containers at 70° C. for 18 hours. By contrast, another copolymer sample from the same polymerization reactor product and which not so treated would drop in specific viscosity to about 1.5 after storage for several months or being placed in an oven at 60° C. for 12 hours.

The most important characteristic of a polymerization initiator is the rate at which it generates free radicals. In general, an increased rate of free radical generation is desirable, in that it accelerates the polymerization reaction and thereby reduces the time to complete the reaction, increases reactor productivity, and reduces manufacturing costs. However, it is also well-known that this free radical generation rate cannot be increased without limit. George Odian, in "Principles of Polymerization", 2nd Edition, John Wiley, New York, 1981, on page 224, teaches that any attempt to increase the polymerization rate by increasing the radical concentration comes at the expense of producing smaller sized polymer molecules. Hence, to provide the desired high molecular weight copolymers, the rate of free radical generation must be strictly controlled.

The rate of formation of free radicals of any initiator is generally expressed by its half-life, the time required to reduce the original initiator content of a diluted solution at a given temperature by 50%. The half-lives are generally determined by differential thermal analysis of solutions of the initiator in monochlorobenzene, wherein the radicals that are formed are immediately destroyed by reaction with the solvent. Note that this particular solvent would also be unacceptable for use as a solvent in the present invention for the same reason. As an example of the decrease of half-life with an increase in temperature, for lauroyl peroxide, sold commercially as Laurox by Akso Chemicals, Inc., the half-life is 10 hours at 62° C. and is 1 hour at 80° C. Operation of the polymerization process at higher temperatures will therefore, in general, increase the rate of the reaction and decrease the average molecular weight.

Organic peroxides are thermally unstable compounds which may undergo exothermic decomposition. A heat accumulation storage test is officially recommended by the United Nations for the determination of the decomposition temperature of organic peroxides (see "Recommendations for the Transport of Dangerous Goods", 5th Edition, United Nations, New York). For a container of pure lauroyl peroxide, for example, it may be stored at temperature of 47.5° C. for at least 9 days without deleterious effects, according to Akso Product Bulletin 88-75, available from Akzo Chemicals, Chicago, Ill. However, at 50° C., the peroxide begins a spontaneous decomposition, exhibiting a rapid increase of temperature and generation of free radicals. This is most undesirable in the conduct of polymerization reactions of the copolymer of the present invention, because it leads to difficulty in the control of molecular weight and stabilization of the copolymer.

Fortunately, the decomposition temperature, at which spontaneous self-accelerating decomposition occurs, is also influenced by the concentration of initiator, the composition of the reactor contents, and the time of the reaction. In the present invention, it is preferred that the reactor be operated below the decomposition temperature of the radical initiator.

Without being bound by theory, it is believed that residual fragments of the free radical initiator, an impurity in the reactor feed components, a reaction byproduct, the alkyl vinyl ether itself, or some combination of these factors, is causing the depolymerization of the polymer chains (the molecular weight of the copolymer declines as measured by the specific viscosity). By depolymerization is meant the degradation and/or decomposition of the copolymer also referenced in British Patent 906,230. This impurity is believed to be adsorbed to the copolymer with such affinity that it is not sufficiently removed in the steps which might be employed by one skilled in the art to remove excess alkyl vinyl ether. It is further believed that the dry gas treatment promotes reactions of free radicals in the gas phase which destroys these radicals, before they can degrade the copolymer. If the dry gas treatment stage of the present invention is employed at too low a temperature, the strongly adsorbed impurity is not removed fast enough to prevent degradation of the copolymer viscosity. If the gas treatment is employed at too high a temperature, the rate of the competitive copolymer degradation reaction is accelerated and the copolymer viscosity is undesirably reduced. Further, at high temperatures, the copolymer becomes lumpy and discolored.

The process of the present invention thereby provides a viscosity-stable copolymer without adding undesirable free radical inhibitors. In the light of the art, as set forth in British Patent 906,230, it is surprising that the use of a moisture-free gas, such as nitrogen, provides a stable copolymer, because such gas is not viewed by one skilled in the art to be a free radical inhibitor. It is also surprising that a moisture-bearing gas will not produce this viscosity stabilization, when moisture does not increase the availability of free radicals. Further, it is surprising that British Patent 906,230 teaches that exposure of the copolymer in a 90° C. oven causes a viscosity decline (Example 8), whereas exposure of copolymer to the treating gas of the present invention at elevated temperatures effects a stabilization of the copolymer. Further, one skilled in the art would not expect there to be a critical operating temperature range of the gas treatment step, outside of which the copolymer is degraded and rendered unsuitable for use.

Surprisingly, the present invention has found that dry gas treatment is effective in producing a stable copolymer produced without extraneous solvents when the treatment step is conducted at temperatures between about 30° C. and 100° C. and preferably at temperatures of 40° C. to 85° C. The gas treatment step may be conducted in any equipment known to one skilled in the art which provides intimate contacting between the treatment gas and the copolymer, such as a tower in which the copolymer is contained and through which flows the treatment gas.

The dry gas stabilization stage should be conducted such that the cumulative moisture in the stabilizing gas does not exceed 1% on a molar equivalent basis to the anhydride groups in the copolymer being so treated. Preferably, the moisture content of the dry gas does not exceed that associated with a dew point of −25° F. and more preferably −100° F.

The present invention will be more readily apparent from the following examples.

The following comparative examples are provided to demonstrate the instability of the copolymer of maleic anhydride and alkyl vinyl ether when produced from a solvent containing substantially all alkyl vinyl ether. The specific viscosity of the copolymer is shown to decline with storage at ambient conditions and to decline rapidly at the elevated temperatures associated with processing the copolymer to consumer products. The instability of the copolymer appears to be associated with degradation and/or decomposition of the copolymer and is unacceptable for commercial use.

The examples which follow the comparative examples show the results of the stabilization process of the present invention, using a two stage process containing a polymerization reaction in an alkyl vinyl ether solvent and a dry gas stabilization stage. The copolymer exhibits no instability at either ambient or elevated temperatures. It is a high purity copolymer without any foreign substances such as extraneous reaction solvents, benzene (a carcinogen), methylene chloride (a carcinogen), toluene (a gasoline component), or free radical inhibitors. Its production can also be controlled to be at desirably high molecular weight.

COMPARATIVE EXAMPLE 1

In order to demonstrate the unstable copolymers produced heretofore, 50 lbs. (22,680 grams) of maleic anhydride and 0.6 lbs. (272.2 grams) of lauroyl peroxide were charged to a stainless steel reactor equipped with a heating jacket and a mechanical agitator. The reactor was sealed and purged with cylinder nitrogen. The reactor was then vacuum evacuated to a pressure of 26 inches of mercury ("Hg). Then, 250 lbs. (113,400 grams) of methyl vinyl ether was charged to the reactor. The reactor contents were heated to 60° C. while agitating, accomplished by passing a hot water/glycol solution through the heating jacket. The reaction proceeded at temperatures of 60°–67° C. for approximately 30 minutes. Complete conversion of maleic anhydride was obtained, as confirmed by testing a sample removed from the reactor through sample valves with triphenylphosphine treated filter paper. Unreacted methyl vinyl ether was removed by evaporation at its vapor pressure, followed by vacuum drying at 50° C. and 28 "Hg. When removal of methyl vinyl ether was substantially complete, the product copolymer was recovered as a fine, white, free flowing powder. The specific viscosity of the copolymer was measured to be 3.51, in a 1% (wt./vol.) solution in methyl ethyl ketone.

A sample of this copolymer was stored at ambient temperatures of 20°–30° C. under a nitrogen atmosphere with no further processing. Within 5 days, the specific viscosity had declined to 3.30. At 9 days, the specific viscosity was measured to be 2.85. At 20 days, the specific viscosity was measured to be 2.70. At 55 days, the specific viscosity had further declined to a measured value of 1.67. All specific viscosity measurements were made in a 1% (wt./vol.) solution in methyl ethyl ketone at 25° C. The viscosity instability is due to degradation and/or decomposition of the copolymer, rendering the copolymer undesirable for commercial use.

COMPARATIVE EXAMPLE 2

In order to characterize the viscosity instability of copolymers when exposed to elevated temperature, 62.5 lbs. ( 28,350 grams ) of maleic anhydride and 0.76 lbs. (344.7 grams) of lauroyl peroxide were charged to a stainless steel reactor equipped with a heating jacket and agitator. The reactor was sealed and purged with cylinder nitrogen. The reactor was then vacuum evacuated to 26" Hg. Then, 312 lbs. ( 141,523 grams ) of methyl vinyl ether was charged to the reactor. While agitating, the reactor was heated to 60° C. by means of a hot water/glycol mixture passed through the jacket. The reaction proceeded for about 30 minutes at temperatures of 60°–67° C. Complete conversion of maleic anhydride was confirmed by testing a sample removed through sample valves with triphenylphosphine impregnated filter paper. Unreacted methyl vinyl ether was removed from the reactor first by evaporation at its vapor pressure, followed by vacuum drying at 50° C. and a vacuum of 29" Hg. After removal of the methyl vinyl ether, approximately 99 lbs. (205,753 grams) of a fine, white, free flowing powder was recovered from the reactor.

The specific viscosity of this copolymer product was measured to be 4.43, in a 1% (wt./vol.) solution of methyl ethyl ketone at 25° C. The solution was clear and bright. A sample of this copolymer was placed in a laboratory oven at 75° C. for 16 hours. After removal from the oven, the specific viscosity of the copolymer was measured to be 2.11, in a 1% (wt./vol.) solution of methyl ethyl ketone at 25° C.

The copolymer of maleic anhydride and alkyl vinyl ether when polymerized in a solution of alkyl vinyl ether thus exhibits a substantial instability of the viscosity when exposed to temperatures typical of processing the copolymer into consumer products. This instability associated with degradation and/or decomposition of the copolymer is undesirable for commercial utilization.

COMPARATIVE EXAMPLE 3

In order to prepare copolymer in accordance with the teachings of U.S. Pat. No. 5,047,490, 10.0 grams of maleic anhydride and 0.0354 grams of lauroyl peroxide were charged to a 500 ml glass reactor. The reactor was then purged with nitrogen and chilled to 0° C. Then, 58.0 grams of methyl vinyl ether was charged to the reactor and the reactor was sealed. The reactor was heated to 60° C. in an oil bath with the reactants agitated. After 3.5 hours at 60° C., the complete conversion of maleic anhydride was confirmed by testing the reactor contents with a triphenylphosphine impregnated filter paper. The unreacted methyl vinyl ether was removed by evaporation, heat, and vacuum. A free flowing white powder product was recovered from the reactor.

The specific viscosity of the copolymer was measured at 5.14 in a 1% (wt./vol.) solution of methyl ethyl ketone at 25° C. A sample of this copolymer was stored at ambient temperatures of 20°–25° C. for 5 days. At 5 days of storage, the specific viscosity measured 4.54 in a 1% (wt./vol.) solution in methyl ethyl ketone at 25° C. A sample of this copolymer was placed in a laboratory oven at 75° C. for 94 hours. After removal from the oven, the specific viscosity of the copolymer product was measured at 1.6 in a 1% (wt./vol.) solution of methyl ethyl ketone at 25° C. It is concluded that this copolymer exhibits viscosity instability, due to degradation and/or decomposition of the copolymer on storage. Further, the instability is unacceptably accelerated at temperatures commonly used in processing the copolymer into consumer products, making it undesirable for most applications.

EXAMPLE 4

As an example of the use of the present invention to produce a stabilized copolymer, a sample of the copolymer produced in Comparative Example 2 was stored at ambient temperatures for 12 days, for laboratory scheduling convenience. After 12 days of storage, the specific viscosity of this sample was 3.78 as measured in a 1% (wt./vol.) solution of methyl ethyl ketone at 25° C.

To demonstrate the process of the present invention, the 12 day copolymer product from the polymerization stage was charged to the second stage for gas treating and stabilization. A 3.4 lb. (1542.2 gram) aliquot of copolymer was placed in a cylindrical glass reactor. The glass reactor was 15.25 cm outside diameter and the sample occupied a 53.3 cm bed height. The reactor was equipped with a fine mesh nylon screen and stainless steel support to retain the copolymer sample and to distribute gas through the copolymer. Standard grade cylinder nitrogen was electrically preheated and distributed in upflow through the copolymer sample. The average gas rate was 18.1 liters per minute. The copolymer was initially charged at an ambient temperature of 20° C. In one hour of operation, the copolymer was heated to an average temperature of 80° C. The copolymer temperature was maintained in the range of 70° C. to 84° C. for 7 hours. The copolymer was then cooled to 22° C. under nitrogen flow at 7.5 liters per minute.

Upon completion of the reaction, samples were removed. The specific viscosity of the copolymer removed from the reactor was determined to be, by repeat measurements, between 3.33 and 3.43, in a 1% (wt./vol.) solution of methyl ethyl ketone at 25° C. The solution was clear and bright. Another sample of the copolymer product from the reactor was placed in a laboratory oven for 24 hours at 60° C. After removal from the oven, the copolymer specific viscosity was determined to be 3.39, in a 1% (wt./vol.) solution of methyl ethyl ketone at 25° C. Another sample of the copolymer product from the reactor was also stored at ambient temperatures of 20°–25° C. After 45 days the specific viscosity was measured to be 3.42 and after 75 days the specific viscosity was 3.37, both measured in 1% (wt./vol.) solutions of methyl ethyl ketone at 25° C. All copolymer solutions in methyl ethyl ketone were clear and bright.

Considering normal experimental error, all of these specific viscosity results are equivalent. The copolymer product produced by the method of the present invention exhibits excellent stability, both in extended storage and when exposed to elevated temperatures. In addition, the stabilization method was able to arrest the decline in viscosity which had started in the initial 12 day storage period without the addition of any foreign substance which would impair copolymer purity.

EXAMPLE 5

A reactant in the amount of 65 lbs. (29,484 grams) of maleic anhydride and an initiator in the amount of 0.58 lbs. (263 grams) of lauroyl peroxide were charged to a stainless steel reactor equipped with an agitator and a heating jacket. The reactor was sealed and purged with nitrogen and then evacuated with a vacuum pump to 24" Hg. Then, 325 lbs. (147,420 grams) of methyl vinyl ether was charged to the reactor. While agitating the reactor contents, the temperature was raised to 60° C. by passing a hot water/glycol solution through the jacket. The reaction proceeded for about 30 minutes in the temperature range of 60°–65° C. Complete conversion of maleic anhydride was accomplished, as confirmed by testing a sample recovered from the reactor through sample valves with a triphenylphosphine impregnated filter paper. Excess methyl vinyl ether was removed from the reactor by evaporation at its vapor pressure, followed by further evaporation at a vacuum of 25" Hg at 50° C. After vacuum removal of methyl vinyl ether was complete, approximately 100 pounds of a fine, white free flowing powder was recovered from the reactor.

Subsequently, this reactor product was stabilized by the method of the present invention. A 25.5 lb. (11,567 gram) portion of the copolymer taken from the Polymerization stage was charged to a cylindrical stainless steel second stage reactor. The reactor had a 45.7 cm outside diameter. It was equipped with a nylon mesh screen and a perforated steel distributor which provided support for the copolymer and distribution of gas through the copolymer bed. The copolymer charge resulted in a bed height of 29.2 cm. Liquid nitrogen was vaporized through a regulator and preheated electrically before being distributed through the copolymer bed. The gas rate was 198.2 liters per minute. The copolymer initially was charged to the reactor at an ambient temperature of 19° C. Over 90 minutes, the copolymer was heated by the flowing gas to 76° C. For 2.5 hours the copolymer was maintained under flowing nitrogen in the temperature range from 76° C. to 89° C., with an average temperature of 85° C. The copolymer was then cooled under flowing nitrogen to below 50° C. and removed from the reactor.

The specific viscosity of the copolymer product from the polymerization stage was measured to be 3.36, in a 1% (wt./vol.) solution of methyl ethyl ketone at 25° C. The product from the second stage reactor was measured to have a specific viscosity of 3.05, in a 1% (wt./vol.) solution in methyl ethyl ketone at 25° C. A sample of this second stage product was placed in a laboratory oven at 70° C. for 18 hours. After removal from the oven, the specific viscosity of the copolymer was measured to be 3.04, in a 1% (wt./vol.) solution in methyl ethyl ketone at 25° C. Another sample of this stabilized copolymer was stored at ambient temperatures of 20°–30° C. After 20 days, the specific viscosity was measured to be 3.11, which is statistically equivalent to the viscosity of the copolymer immediately after stabilization. That is, the copolymer no longer loses viscosity due to copolymer degradation and/or decomposition during storage. After 95 days, the specific viscosity was measured to be 3.12. Both measurements were made in 1% (wt./vol.) solutions of methyl ethyl ketone at 25° C.

The foregoing demonstrates that the method of the present invention is highly effective in providing a stabilized copolymer of maleic anhydride and alkyl vinyl ether, without adding any undesirable foreign substances to effect viscosity stability and to prevent degradation and/or decomposition both on storage and at elevated temperatures used for processing the copolymer into consumer products.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the preparation of copolymers of maleic anhydride and alkyl vinyl ethers having a stable specific viscosity, which comprises: providing a copolymer of maleic anhydride and an alkyl vinyl ether, wherein the alkyl group contains from 1 to 5 carbon atoms; contacting said copolymer with a flowing stream of non-reactive substantially moisture free gas at a temperature of from about 30°-100° C. for from about 0.5-24 hours at sub-critical pressure, thereby stabilizing the specific viscosity of the copolymer and providing a copolymer which does not degrade on storage or upon exposure to elevated temperature.

2. Process according to claim 1 wherein the gas is nitrogen.

3. Process according to claim 1 wherein the temperature is from about 40°-85° C.

4. Process according to claim 1 wherein the reaction time is from about 2-10 hours.

5. Process according to claim 1 including the step of preparing said copolymer by reacting together maleic anhydride and an alkyl vinyl ether in the presence of a free radical initiator.

6. Process according to claim 5 wherein the maleic anhydride and alkyl vinyl ether are reacted together in a stoichiometric excess of ether, with the molar ratio of ether to maleic anhydride being between about 1.05:1 to 25:1.

7. Process according to claim 6 wherein the ratio of ether to maleic anhydride is between about 2:1 to 10:1.

8. Process according to claim 6 wherein the maleic anhydride and ether are reacted together in the absence of an organic solvent.

9. Process according to claim 6 wherein the initiator is present in an amount from about 0.001 to 5% based on the weight of the maleic anhydride.

10. Process according to claim 9 wherein the amount of initiator ranges from about 0.1-2%.

11. Process according to claim 6 wherein the polymerization reaction is conducted at a temperature of about 30°-90° C.

12. Process according to claim 11 wherein said polymerization reaction temperature is from about 40°-70° C.

13. Process according to claim 11 wherein the polymerization reaction takes place at a temperature less than the decomposition temperature of the initiator.

14. Process according to claim 6 wherein excess ether is removed after completion of the reaction.

15. Process according to claim 6 wherein the stabilization reaction and the polymerization reaction are conducted in separate reaction vessels.

16. Process according to claim 11 wherein the polymerization reaction temperature is increased to initiate the polymerization reaction after dissolution of the maleic anhydride and the initiator in a stoichiometric excess of ether, to form a suspension of copolymer in ether.

17. Process according to claim 6 wherein the stabilized copolymer has a specific viscosity from about 0.1 to 5.5.

18. Process according to claim 17 wherein said specific viscosity is from about 1.5-4.5.

19. Process according to claim 17 wherein said specific viscosity is from about 2.5-4.0.

20. Process according to claim 6 wherein the ether is methyl vinyl ether.

* * * * *